Feb. 1, 1966  H. J. KIMMERLE  3,232,846
SOLAR-VACUUM SEA WATER DISTILLATION APPARATUS
Filed March 22, 1962  3 Sheets-Sheet 1
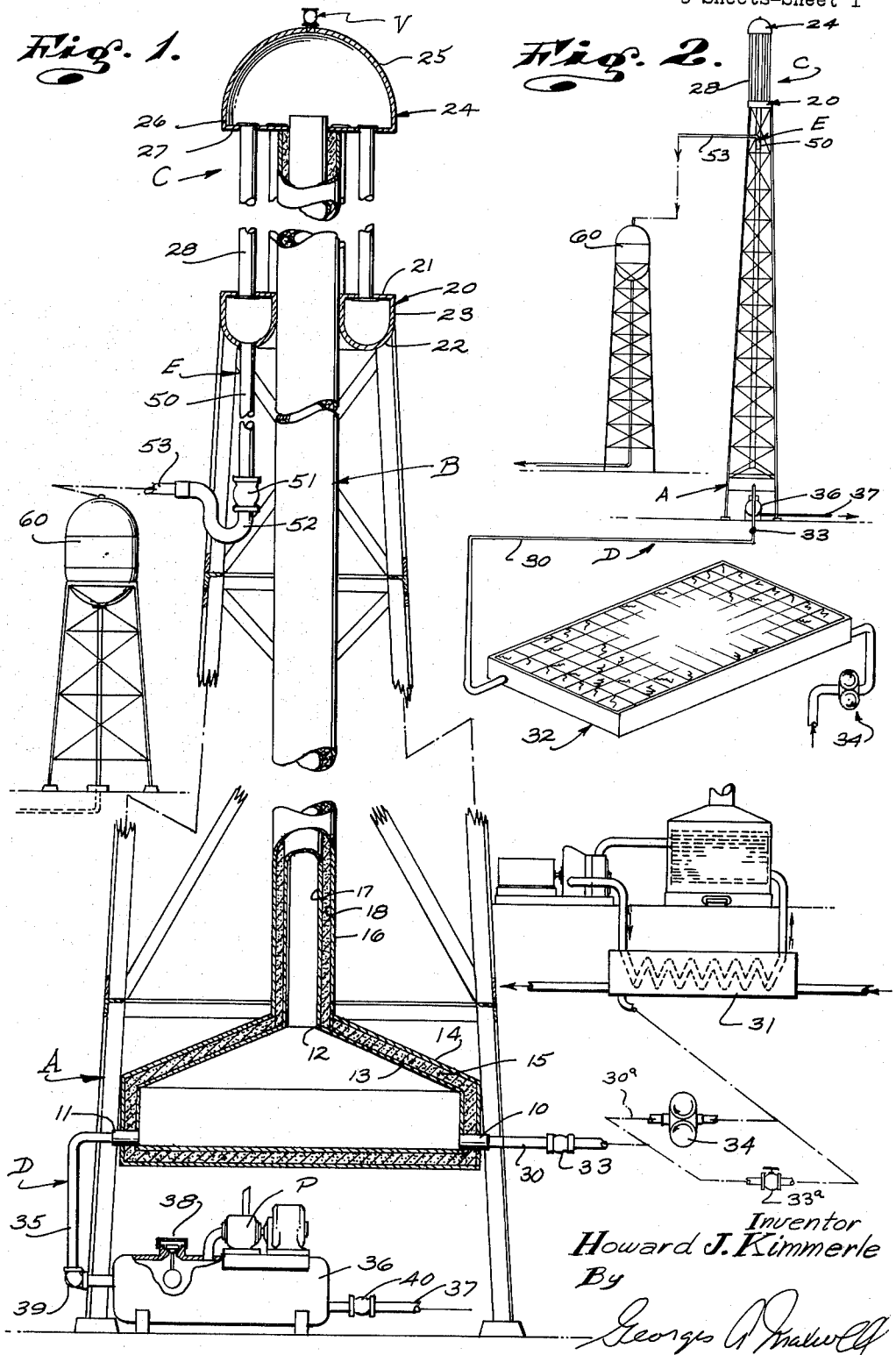
Inventor
Howard J. Kimmerle
By

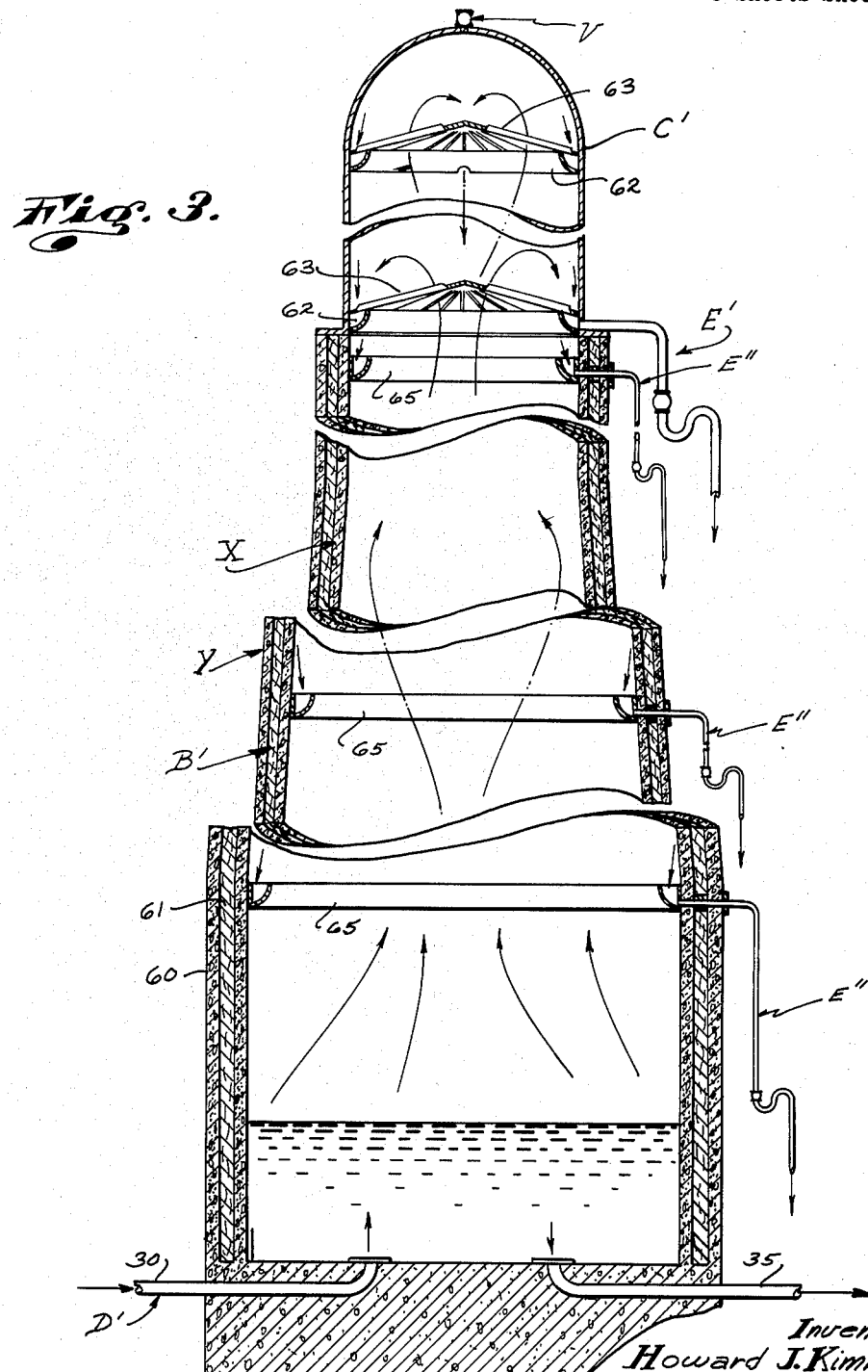

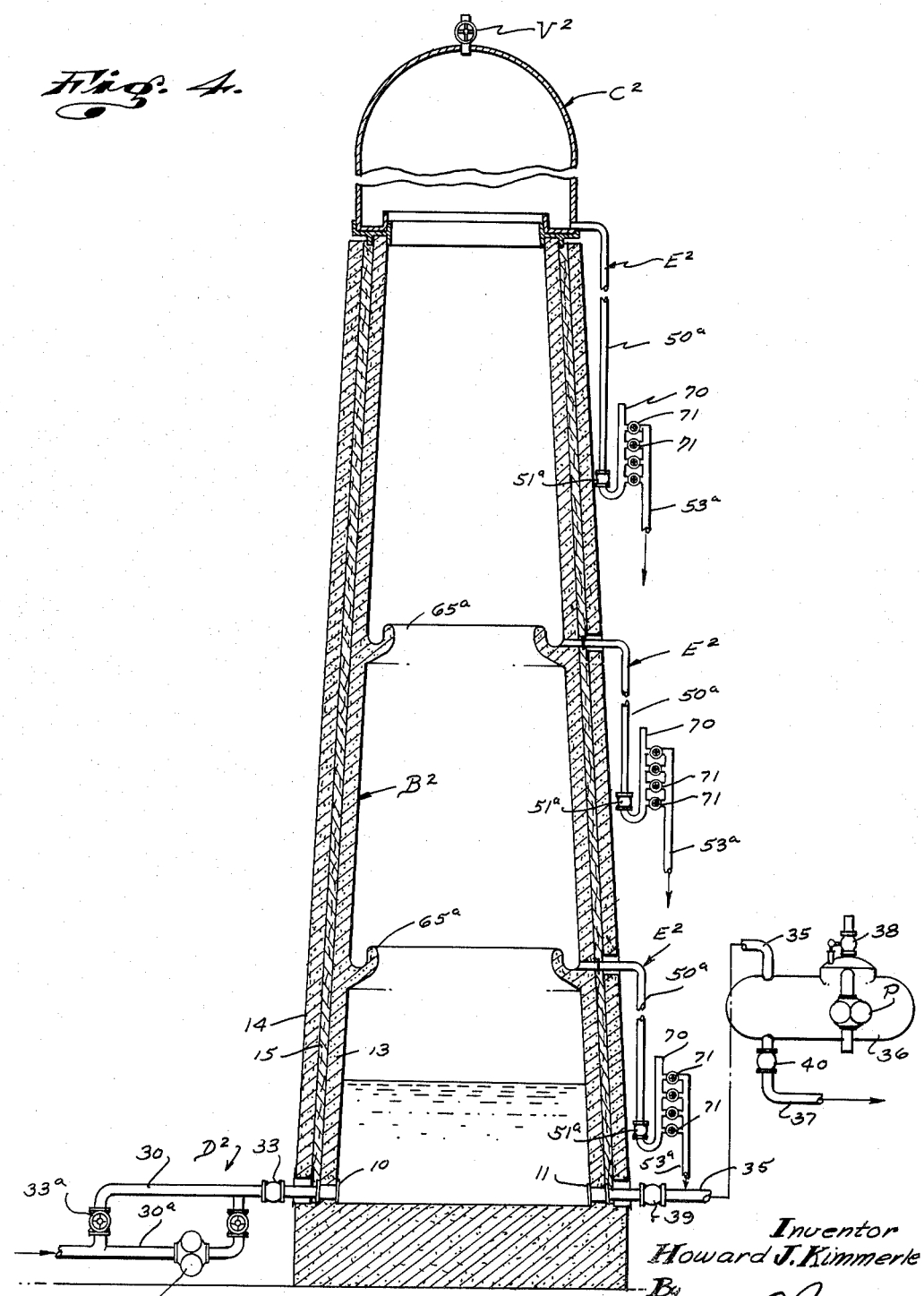

# United States Patent Office 3,232,846
Patented Feb. 1, 1966

3,232,846
SOLAR-VACUUM SEA WATER DISTILLATION
APPARATUS
Howard J. Kimmerle, 5602 Long Beach Blvd.
Long Beach 5, Calif.
Filed Mar. 22, 1962, Ser. No. 181,690
5 Claims. (Cl. 202—185)

This invention relates to a novel method and apparatus for producing fresh water from brackish or sea water, and the like.

In recent years, much attention has been given to the development and the inventing of a commercially feasible and practical means to convert brackish or sea water into fresh water to overcome the ever-increasing fresh water shortage in many areas, and to provide adequate quantities of fresh water in arid climes for domestic and agricultural use, where the land has lain dormant for want of water.

Many small evaporator-condenser type water conversion units have been used in ships and in special land installations for the limited production of distilled and/or drinking water. Such units are extremely inefficient and expensive to operate, and as a result cannot be employed to provide large quantities of fresh water at commercially feasible rates.

It is well established that the only practical way to convert brackish water, or sea water, into palatable fresh water is to evaporate it, to condense the vapor or steam, and to collect the condensate, which is fresh water. Such a process requires that the temperature of the brackish or sea water be raised to boiling, or that it be subjected to a vacuum which results in its boiling and vaporizing, or that the water be subject to a minus or subatmospheric pressure to lower its boiling point, and its temperature raised a sufficient amount to result in its boiling and vaporizing.

Raising the temperature of the sea water from normal or tepid temperatures to boiling temperatures under atmospheric pressure requires the transfer of many B.t.u.'s and the expenditure of much costly power or fuel.

Efforts have been made to use solar heat to raise the temperature of sea water to a temperature where evaporation can be economically effected. By the use of special equipment it has been possible to economically bring the temperature of sea water up to about 120° F. by using solar energy, but such a temperature is considerably below the normal 212° F. required to boil water under atmospheric pressure.

It is not difficult or costly to establish and maintain a partial vacuum in a large receiver, for example, an atmosphere of about 26 to 28 inches of mercury can be readily established and maintained.

By using solar heat to bring the water temperature to about 20° or 30° above the surrounding air temperature, and then subjecting the heated water to a suitable partial vacuum or subatmospheric pressure, so as to lower its boiling point, a relatively inexpensive process for converting brackish or sea water to fresh water can be obtained. The energy which must be expended to create the said partial vacuum, by presently accepted methods, that is, by motor driven pumps or steam jets, is considerable, and represents a prohibitive cost factor in the end product.

Some efforts along the above lines have been carried out in connection with steam electric plants along our nation's coastline, where wasted steam and heat energy resulting from the generation of electricity can be salvaged and utilized. In the ordinary steam electric plant, millions of gallons of water are pumped through heat exchangers each day, and are discharged into the ocean or sea at temperatures from 5° to 20° above intake temperatures.

A hidden cost, or a cost not normally considered in water conversion plants of the character referred to, is the cost of pumping the fresh water to a point of use, or pumping it up into a standpipe or water tower to establish the necessary head thereon for its introduction into a water distributing system, or the like. The expense of elevating the condensed fresh water to establish the necessary head, or pumping it to establish and maintain such a head, is substantial and represents a material expense.

An object of the present invention is to provide a novel method and apparatus for converting sea water into fresh water.

Another object of my invention is to provide a novel method and apparatus of the character referred to which is highly effective and dependable, a structure which, when once put into operation continues to operate automatically, and which is, therefore, highly efficient and economical to operate.

A feature of the present invention is to conduct the steam or vapor from sea water, or the like, upwardly a substantial distance, and to condense it in an elevated chamber or condenser, whereby the condensed, fresh water will be delivered high up and need not subsequently be pumped up to a water tower, or otherwise acted upon to establish an operating head pressure thereon.

Still another object of my invention is to provide an apparatus of the character referred to wherein the elevated condensed water, through the force of gravity and atmospheric pressure, and by the employment of barometric legs, is used to maintain and control a subatmospheric pressure within the construction, and on the sea water therein, to lower its boiling temperature a sufficient extent so that the temperature of the sea water can economically be raised a sufficient amount to effect rapid evaporation by solar heat, or by employing it as a cooling medium in the steam condensers of a steam electric plant.

A further object of the present invention is to provide a lower, pressure-sealed, heated, or heat-insulated evaporating chamber in which heated sea water is placed, an upper, pressure-sealed cooling or condensing chamber to receive vaporized sea water and to condense it, and a heat-insulated, vapor-conducting and elevating column extending and establishing communication between the upper and lower chambers.

Another object of my invention is to provide a construction wherein the atmosphere in the construction is purged of air and consists of water vapor only, a construction wherein the atmospheric pressure within is about 26 to 29 inches of mercury, and a construction wherein the temperature differential between the sea water and the interior walls of the lower chamber and that of the interior walls of the upper chamber is enough to cause condensation on the walls of the upper chamber.

Another object of the present invention is to provide novel means to maintain a flow of heated sea water through the lower chamber and to withdraw condensed fresh water from the upper chamber or condenser without breaking or losing control of the partial vacuum within the construction.

Another object of my invention is to utilize the effect of condensation of water vapor to maintain a vacuum or subatmospheric pressure within the construction.

The various objects and features of my invention will be fully understood from the following detailed description of typical preferred forms and applications of my invention, throughout which description reference is made to the accompanying drawings, in which:

FIG. 1 is a diagrammatic view of my new apparatus;
FIG. 2 is a diagrammatic view of another form of my invention;

FIG. 3 is a view of another form of my invention; and

FIG. 4 is a view of yet another and preferred form of my invention.

The apparatus provided by the present invention includes, generally, a lower, insulated evaporating chamber A, an elongate, vertically disposed, insulated lift column B communicating with the chamber A, an upper cooling chamber or condenser C at the upper end of the column B, water supply means D to supply water to the chamber A, and water discharge means E related to the condenser C.

The evaporating chamber A is a relatively large closed chamber having a water inlet fitting 10 and a water outlet fitting 11 at its lower end, and a steam or vapor outlet opening 12 at its top.

The chamber A is a heat insulated structure, and, in the case illustrated in FIG. 1 of the drawings, is shown as having an inner wall 13 formed of steel, an outer wall 14 of like construction, and a filler 15 of insulating material, such as cork, foam plastic, or the like, between the walls 13 and 14.

The column B communicates with the opening 12 in the top of the chamber A and projects upwardly therefrom.

The column B, like the chamber A, is an insulated double-walled structure having inner and outer walls 16 and 17, and an insulating filler 18 between said walls.

The column B is preferably of considerable vertical extent. The column can be in excess of 200 feet.

The condenser C can be of any suitable construction and in FIGS. 1 and 2 of the drawings is shown as including an annular or disc-shaped base tank 20 with top, bottom, and side walls 21, 22 and 23, a disc-shaped head tank 24 having a round or semi-spherical top wall 25, side walls 26, and a bottom wall 27 arranged in spaced vertical relationship above the base tank, and a plurality of vertically disposed condensing tubes 28 extending between and communicating with the tanks.

In practice, the structural design and configuration of the chamber A, column B, and condenser can be varied considerably without affecting the novelty of the invention and so as to assure their withstanding the forces of atmosphere acting upon them.

The upper end of the column B extends through the lower tank between or within the tubes 28 and communicates with the upper or head tank 24 at the bottom wall thereof, as clearly illustrated in the drawings.

The upper end of the condenser is provided with a manually operable bleed valve V to facilitate bleeding the air from the construction when it is being put into operation, as will hereinafter be described.

The top wall 25 of the head tank is spherical, establishing an enlarged chamber wherein the vapors introduced into the tank can start to condense and the walls of which are so disposed that water condensed thereon will run downwardly and outwardly to the peripheral portion of the tank and into the tubes 28 related thereto.

Water running or cascading down the walls of the head tank and into and through the tubes 28, scrubs the vaporous atmosphere in the tank and in the tubes to enhance condensation and to remove traces of air introduced into the construction by the water flowing into and through the chamber A, and also induces a flow down the tubes 28, which flow scavenges the upper tank and induces a minus pressure in the remainder of the construction.

Since the volumetric ratio between water and steam is in excess of 1600:1, when the steam or vapor enters the condenser and is condensed, as a result of cooling, an additional dropping of the pressure in the condenser is effected, which is immediately and directly communicated with the column B and the chamber A, thereby maintaining the minus pressure in the construction.

The drop in pressure effected by the condensing of the vapor in the condenser C is cumulative with the scavenging effect of the dropping or cascading water in the condenser tubes.

In practice, the tubes 28 of the condenser C can be of such vertical extent that a maximum scavenging and scrubbing effect is obtained by the dropping and/or cascading water therein. In practice, the tubes can be 50 to 100 feet in length.

The water supply means D is shown as including a supply line 30 connected with the inlet fitting 10 of the chamber A. The line 30 is adapted to deliver preheated water into the chamber A. The line 30 can, as shown in FIG. 1 of the drawings, extend from the coolant side of a condenser or heat exchanger 31 of a steam electric plant, or, as illustrated diagrammatically in FIG. 2 of the drawings, it can extend from a suitable solar preheating apparatus 32, or other suitable source of heated sea water.

The line 30 is, preferably, insulated and is provided with a check valve 33 to prevent backflow therethrough, a shutoff valve 33$^a$, a bypass line 30$^a$ bridging the valve 33$^a$, and a suitable pump 34 in the bypass line. The valve 33$^a$ and pump 34 provides one means for putting the construction into operation.

The means D further includes a discharge line 35 extending from the outlet fitting 11 on the chamber A and connected with a transfer tank 36. The transfer tank 36 has an outlet line 37 extending from it, a vacuum pump P communicating with it, and a float-controlled air inlet valve 38 related to it.

Check valves 39 and 40 are provided in the lines 35 and 37 to prevent backflow of water through said lines.

The tank 36 is spaced from 15 to 30 feet below the lower end of the chamber A, whereby the line 35 establishes a partial barometric leg.

The water discharge means E related to the condenser C includes an elongate standpipe or barometric leg 50 connected with and depending from the lower tank of the condenser C for from 15 to 30 feet, as circumstances require, and is provided with a check valve 51 at its lower end and a gooseneck or water trap 52 below the valve 51. The gooseneck communicates with a flow pipe 53. The trap 52 supplements the valve 51 and prevents air from backing up the pipe 50 and into the construction.

The leg or standpipe 50 is of sufficient vertical extent to hold a sufficient head or column of water to overcome the subatmospheric pressure in the apparatus and permit the free flow of water therefrom. That is, when the construction is in operation, the standpipe fills with water until the minus pressure in the construction is overcome, whereupon a sufficient head is established in the standpipe to open the valves 51 and allow for outward flow of fresh water from the construction.

The column of water in the standpipe 50 also serves to aid in maintaining and controlling the desired subatmospheric pressure in the apparatus.

It will be apparent that in the form of the invention now under consideration, the lowest pressure obtainable in the construction is fixed and determined by the length of the barometric leg. In practice, however, means can be provided to vary the effective length of the leg, as illustrated in FIG. 4 of the drawings and as will be hereinafter described.

When setting the construction in operation, the valve V is opened and boiling water is pumped into the chamber A by the pump 34. The steam or vapor issuing from the water fills the construction, displacing the air through the valve V. When the construction is exhausted of air and filled with vapor, the valve V is closed, the pump 34 is taken out of operation, and the supply of boiling water is discontinued and the supply of preheated water, on which the construction is intended to operate, is substituted therefor.

Under ideal conditions, the vapor in the condenser condenses, creating a minus pressure, the condensed water fills, the standpipe or barometric leg 15, enhancing and maintaining the minus pressure, and the construction is in operation.

In practice, to set the construction into operation more rapidly, the vacuum pump P of the means D is, or can be, set into operation so as to draw and initially establish the desired minus pressure in the construction.

The tank 36 of the means D, being spaced below the chamber A and connected therewith by the line 35, a partial barometric leg is established thereby to enhance the drawing and maintenance of the subatmospheric pressure, and a flow is established out of the chamber, which outward flow, combined with the minus pressure, creates and maintains an inward flow through the line 30. This continuous flow into and out of the chamber A prevents the water in the chamber from reaching a concentrated condition where the salts therein will start to precipitate.

A suitable flow means can be provided in the line 35 to control the flow rate through the chamber.

In practice, it may take several days to adequately heat the chamber A and the column C, but when heated so as to maintain the vaporized water vaporized all the way up the column to the condenser at the top thereof, where it is rapidly cooled and condensed, the apparatus will continue to operate, automatically, so long as water, heated to a degree proportionate with the subatmospheric pressure in the construction to effect boiling or rapid evaporation, is introduced into and is present in the chamber A, and so long as a sufficient temperature differential occurs between the chamber A and the walls of the condenser C.

The fresh water condensed in the condenser C is discharged at a point about 30 feet below the condenser C at the top of the column B, which column is preferably in excess of 200 feet high. Accordingly, the fresh water is well over 150 feet above ground when discharged from the apparatus for use, and need not be pumped up to establish a working head, as is the case with the ordinary water conversion plant.

If desired, the water can simply be transferred to an adjacent water tower 60, as illustrated in the drawings.

In the form of the invention illustrated in FIG. 3 of the drawings, the chamber A' and the column B' are established by zones in an elongate, vertically disposed tubular tower X, which tower can be established of reinforced concrete. The tower establishing the evaporating chamber A' and the vapor lift column B' is jacketed with a suitable heat insulating structure Y, which structure can include an outer reinforced concrete shell 60 and a filler 61 of cork, or the like, between the shell and the tower.

The condenser C' is an elongate, vertically disposed tubular extension on the tower and is formed of a heat conducting material, such as steel, and provided with a spherical head or dome, so as to withstand the atmospheric pressures exerted on it.

The condenser C' is, as illustrated, provided with suitable vertically spaced annular catch basins 62 about its interior, and with one or more trays 63, to catch and conduct away the water in the condenser, as it condenses and precipitates on the walls or trays.

The water supply means D' and discharge means E' in this form of the invention now under consideration are the same as in the previously discussed forms of the invention.

If desired, several vertically spaced annular catch basins 65 can be provided in the column zone $b'$ of the tower to conduct any precipitation or condensation established on the walls of the tower, below the condenser. The basins 65 are shown as fabricated steel units may be secured in the tower in any suitable manner.

Discharge means E'', similar to the means E' and involving barometric legs, are provided for the catch basins 65.

To start operating this form of the invention a continuous flow of water, heated to above boiling, that is, above 212° F., is conducted through the chamber A'. The vapor issuing therefrom initially purges the air from the construction through the valve V' and completely fills the construction.

The vapors, being heated, rise through the column B' and into the condenser C', where they are rapidly cooled and condense. Condensing of the vapors purges the construction of its atmosphere of water vapor, making it more rare, and thereby maintains the minus pressure within, and induces further vaporization in the lower, heated portions of the construction.

By providing a continuous supply of sea water at about 120° F., from either a solar heating means or from a heat exchanger at a steam electric plant, and subjecting it to a minus pressure of 26 to 29 inches of mercury in the tower, rapid vaporization of the sea water and a high differential in temperature between the evaporating chamber and condenser is assured.

In practice, however, the temperature of the water need only be raised 10 F. or 25 F. above the ambient temperature of the air outside of the condenser, in order to effect a sufficient temperature variation to bring about automatic functioning of the construction.

It is to be noted that the barometric leg or legs in my invention serve as vacuum control means 1. That is, the vacuum or sub-atmospheric pressure in the construction, once established, is maintained by the legs. By varying the vertical extent of the legs, the maximum or desired vacuum or minus pressure can be controlled.

In the form of the invention illustrated in FIG. 4 of the drawing, I have illustrated a preferred form of discharge means $E^2$ for the condenser $C^2$ and the catch basins $65^a$, wherein the trap $52^a$ below and extending from the check valve $51^a$ at the lower end of the pipe $50^a$, is provided with an upwardly extending, upwardly opening, extension 70, in which a counterbalancing column of water, flowing past the valve $51^a$, through the trap $52^a$ and acted upon by the atmosphere, is established. The extension 70 is provided with a plurality of vertically spaced T-valve 71, each connected with the delivery pipe $53^a$ and adapted to vary the effective height of the standpipe or barometric leg $50^a$.

In this form of the invention the standpipes $50^a$ are in excess of 30 feet in length and the extensions 70 are of sufficient extent and the valves 71 are so spaced thereon that by opening one of said valves, a predetermined barometric leg can be obtained. For example, four valves 71 can be provided to provide barometric legs of 26, 27, 28 and 29 inches of mercury.

The tower $B^2$ in this last form of the invention is similar to that shown in FIG. 3 of the drawings, except that the catch basins $65^a$ are cast integrally with the inside wall of the tower, and the condenser is not provided with trays.

Having described only typical preferred forms and applications of the apparatus of my invention, and typical manners of carrying out the method of my invention, I do not wish to be restricted or limited to the specific details herein set forth, but wish to reserve to myself any modifications and variations that may appear to those skilled in the art and fall within the scope of the following claims:

Having described my invention, I claim:

1. An apparatus for distilling liquid in a closed vacuum system sealed at one end by the liquid and at the other end by the condensate comprising, an elongate vertically disposed tubular tower having substantially vertically heat insulated side walls, a heat insulated bottom wall and a head-like condenser at the upper end of the side walls and closing the upper end of the tower, said side, bottom and condenser defining a single elongate vertically extending chamber, a plurality of vertically spaced condensate collecting troughs about the interior of the side walls of the tower, pump means communicating with the chamber and operable to establish a subatmospheric pressure therein, liquid supply means to conduct preheated liquid into the lower end of the chamber including, a valve controlled liquid supply pipe communicating with the lower end of the chamber, and condensate delivering means including discharge ports in the side wall of the tower communicating with each trough therein, an elongate vertically disposed standpipe at the exterior of the tower and communicating with and depending from each discharge port, each standpipe being greater in vertical extent than the height of a barometric column of condensate at atmospheric pressure, and a check valve at the lower end of each standpipe to prevent the flow of air upwardly therethrough.

2. An apparatus for distilling liquid in a closed vacuum system sealed at one end by the liquid and at the other end by the condensate comprising, an elongate vertically disposed tubular tower having substantially vertically disposed heat insulated side walls, a heat insulated bottom wall and a head-like condenser at the upper end of the side walls and closing the upper end of the tower, said side, bottom and condenser defining a single elongate vertically extending chamber, a plurality of vertically spaced condensate collecting troughs about the interior of the side walls of the tower, pump means communicating with the chamber and operable to establish a subatmospheric pressure therein, liquid supply means to conduct preheated liquid into the lower end of the chamber including, a liquid supply pipe communicating with the lower end of the chamber, a check valve in the supply pipe to prevent flow of liquid from the chamber therethrough, and a discharge pipe communicating with the lower end of the chamber and depending therefrom to terminate at a point spaced below the lower end of the chamber which is equal to the height of a barometric column of the liquid at atmospheric pressure from the desired liquid level in the chamber, whereby the desired liquid level is maintained in the chamber at all times, and a check valve at the lower end of the discharge line to prevent water and air from flowing into the chamber therethrough, and condensate delivering means including, discharge ports in the wall of the tower communicating with each trough therein, an elongate vertically disposed standpipe communicating with and depending from each discharge port, at the exterior of the tower and being greater in vertical extent than the height of a barometric column of condensate at atmospheric pressure, and a check valve at the lower end of each standpipe to prevent the flow of air upwardly therethrough and into the chamber.

3. An apparatus as set forth in claim 1 wherein, the condenser closing the upper end of the tower comprises a heat conducting metallic extension of the side walls of the tower having a substantially spherical head closing its upper end.

4. An apparatus as set forth in claim 1 wherein the condenser closing the upper end of the tower comprises a heat conducting metallic extension of the side walls of the tower having a substantially spherical head closing its upper end.

5. A structure as set forth in claim 2 wherein the condenser is established of heat conducting metal and has tubular side walls extending upwardly from the side walls of the tower and a semi-spherical top wall, said condenser having vertically spaced upwardly opening troughs about its side walls and apertured, upwardly convergent conical drip trays supported by the troughs to catch and conduct a portion of the condensate to said troughs, and a discharge port in the side wall of the condenser to receive condensate from the troughs therein and communicating with a standpipe similar to the standpipes related to the troughs in the tower.

References Cited by the Examiner
UNITED STATES PATENTS

| | | |
|---|---|---|
| 127,197 | 5/1872 | Simpson. |
| 138,375 | 4/1873 | Brown. |
| 1,043,305 | 11/1912 | Duensing. |
| 1,544,029 | 6/1925 | Nelson. |
| 2,006,985 | 7/1935 | Claude et al. |
| 2,364,411 | 10/1944 | Murphy _____ 202—52 |
| 2,490,659 | 12/1949 | Snyder. |
| 3,096,257 | 7/1963 | Foutz _____ 202—205 |

NORMAN YUDKOFF, *Primary Examiner.*

GEORGE D. MITCHELL, *Examiner.*